May 9, 1967  J. DEBIESSE ETAL  3,319,089
METHODS AND DEVICES FOR GENERATING ELECTRICAL ENERGY FROM
AN IONIZED GASEOUS STREAM HAVING A PRESSURE GRADIENT
Filed May 10, 1963  2 Sheets-Sheet 1
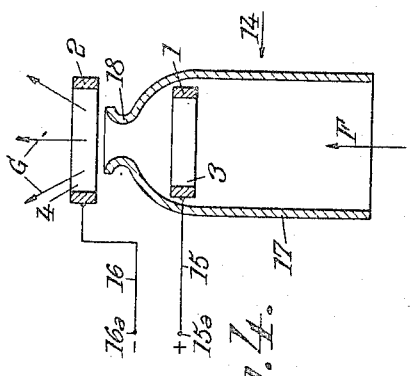
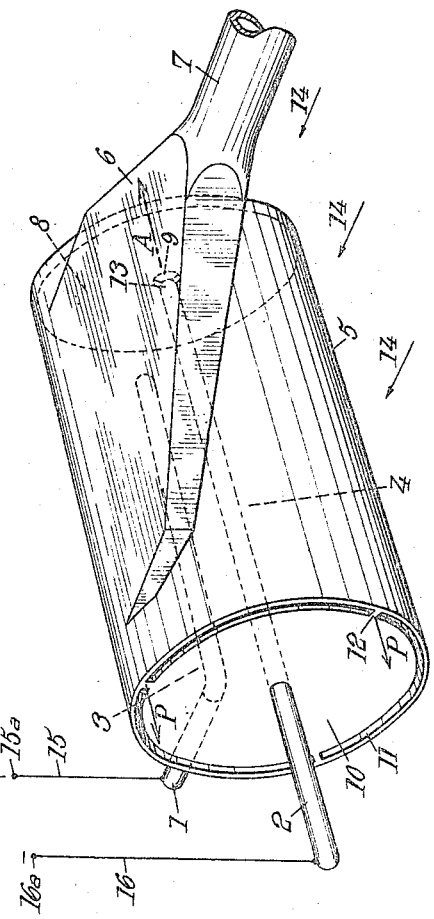
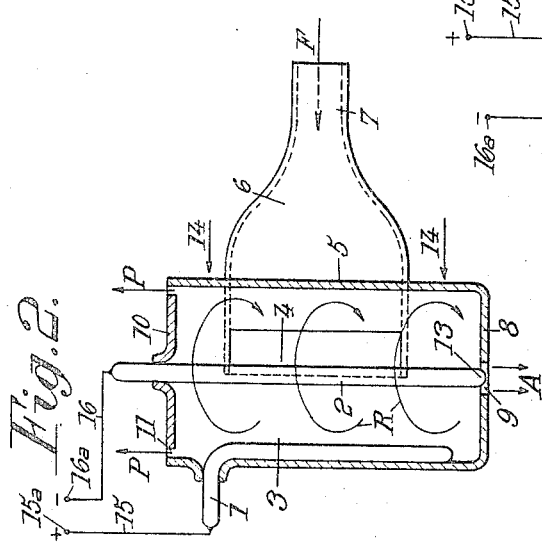
INVENTOR
BY *William D. Stokes*
ATTORNEY

United States Patent Office 3,319,089
Patented May 9, 1967

3,319,089
METHODS AND DEVICES FOR GENERATING ELECTRICAL ENERGY FROM AN IONIZED GASEOUS STREAM HAVING A PRESSURE GRADIENT
Jean Debiesse, Boulogne-sur-Seine, and Siegfried Klein, Paris, France, assignors to Commissariat à l'Energie Atomique, Paris, France
Filed May 10, 1963, Ser. No. 279,544
Claims priority, application France, May 19, 1962, 898,103
10 Claims. (Cl. 310—3)

The present invention relates to a method and a device for generating electrical energy by transforming the energy of ionized radiations (X-rays and gamma-rays in particular) and of fission products (resulting from the action of neutrons on fissionable products) into directly utilizable electrical energy by making use of an ionized gaseous stream having a pressure gradient.

The chief object of our invention is to provide a method and a device making it possible to produce electrical energy under a direct potential difference of several tens of volts from an intensive source of ionizing radiations and/or of neutrons, in particular from a nuclear reactor such as a swimming-pool reactor, in a very simple and easy manner, without mechanical piece in movement (with the exception of the pieces that might be necessary for producing the gaseous stream to be ionized) and without complicated technological arrangements.

According to a main feature of our invention, we dispose, in a gaseous stream having a pressure gradient, two electrodes placed respectively in a first zone and in a second zone of said stream, between which zones there exists, due to said pressure gradient, a pressure difference and we ionize said gaseous stream at least in the portion thereof comprising these two zones. A potential difference, which is an increasing function of the difference of pressure between these two zones and also of the rate or level of ionization of the gaseous stream in said portion, is then available between the two electrodes, the electrode located in the zone at higher pressure becoming positive with respect to the other electrode.

According to a preferred embodiment of our invention, the pressure gradient is obtained by feeding, into a box in the form of a circular cylinder closed at both ends, a gaseous stream along a generatrix of the cylinder and tangentially thereto, and in providing in said box, on the one hand a peripheral slot located in one of the end walls thereof and, on the other hand, a central hole located in the other end wall, so that the gaseous stream escapes from the box through this slot and this hole, which has for its effect to produce a pressure gradient inside the box, the pressure of the gas flowing out through the peripheral slot being higher than the pressure of the gas flowing out through the central hole. In this embodiment of our invention a first electrode is disposed inside the box substantially along the periphery thereof, whereas a second electrode is disposed also on the inside of the box, substantially along the axis thereof. We thus obtain a potential difference between these two electrodes, the peripheral electrode (which may consist either of a linear conductor disposed along one generatrix of the cylinder or of the conducting inner wall of this cylinder) becoming positive with respect to the axial electrode (which may consist of a cylindrical conductor).

As for the ionization of the gaseous stream, it may be produced, for instance, either by ionizing radiations (X-rays, gamma-rays) from a ionizing radiating source such as a nuclear reactor or by layers of fissionable products in contact with the gaseous stream (carried for instance by the axial electrode) and subjected to a flux of neutrons coming from a nuclear reactor, such as a swimming-pool reactor, in which the portion of the gaseous stream to be ionized, for instance the cylindrical box, is immersed. These fissionable products create, under the effect of the neutrons bombardment, ionizing radiations the action of which upon the gaseous stream is much more important than that of the ionizing radiations coming directly from the nuclear reactor.

Preferred embodiments of the present invention will be hereinafter described with reference to the appended drawings, given merely by way of example, and in which:

FIGS. 1 and 2 diagrammatically show, respectively in perspective view and in axial sectional view, a first embodiment of an electric energy generator according to the invention;

FIG. 4 is a sectional view of still another embodiment of a generator according to the invention.

Figure 3:
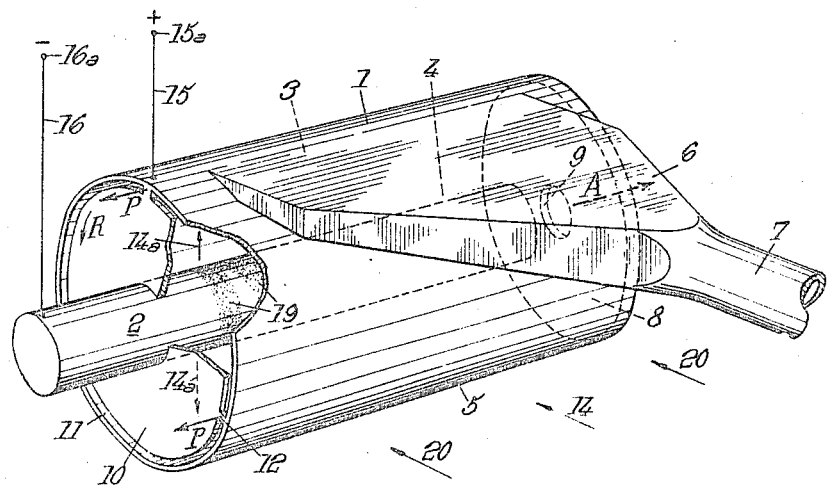
FIG. 3 is a view similar to FIG. 1 showing a modification.

According to the present invention, we dispose, in a gaseous stream having a pressure gradient, two electrodes 1 and 2 placed respectively in a first zone 3 and in a second zone 4 of said gaseous stream. Between these zones, there exists, due to said pressure gradient, a pressure difference $P_1-P_2$ ($P_1$ being the higher pressure, in zone 3, and $P_2$ the lower pressure, in zone 4). We ionize said gaseous stream at least in the portion thereof comprising these two zones. A potential difference which is an increasing functio nof the pressure difference $P_1-P_2$ between said two zones 3 and 4 and also of the rate of ionization of the gaseous stream flowing between said zones is then available between electrodes 1 and 2, the electrode 1 placed in the zone of higher pressure $P_1$ becoming positive with respect to the other electrode 2.

In the embodiments of FIGS. 1 and 2 on the one hand, and 3 on the other hand, we make use, to produce the pressure gradient, of a device comprising a box 5 in the form of a cylinder of circular cross section closed by two end walls 8 and 10. This box is, along at least one generatrix of the cylinder and tangentially to said cylinder, fed with a gaseous stream through a nozzle 6 receiving gas under pressure from a pipe 7, as shown by arrow F. End wall 8 is provided with a central hole 9 whereas end wall 10 is provided with a peripheral slot 11 interrupted by portions 12 serving to hold said end wall 10 in position.

It is known that when a gaseous stream flows with a movement of rotation along arrows R in the device illustrated by FIGS. 1-2 or by FIG. 3, there is produced in said gaseous stream inside box 5 a pressure gradient from the periphery toward the axis of said box, the pressure decreasing from the periphery to the axis. At the same time, there is provided in the gaseous stream a temperature gradient, the temperature also decreasing from the periphery toward the axis. The gaseous stream under pressure escapes from box 5 both through central hole 9 and through peripheral slot 11, the gas that flows through slot 11 (as indicated by arrows P) being at a pressure and a temperature higher than the pressure and temperature of the gas flowing out through central hole 9 (as indicated by arrows A).

When, according to the invention, we dispose a first electrode 1 along the periphery of box 5 (this electrode consisting either of a linear conductor disposed along one generatrix of the box made of a dielectric substance, as in the embodiment of FIGS. 1 and 2, or of the internal conducting surface of the box, as in the embodiment of FIG. 3) and a second electrode 2 extending substantially along the axis of the box (this electrode 2 consisting for instance of a cylinder carried by end wall 10 and extending to a point 13 close to hole 9) and the whole is placed in a flux of ionizing radiations 14 (FIGS. 1 and 2) for instance by placing it in a nuclear reactor such as a swimming-pool reactor, these rays 14 (X-rays, gamma-rays) ionize the gaseous stream flowing through box 5, thus producing a stream of plasma (gas containing negative electrons and positive ions). Electromotive force is then produced, the magnitude of which is an increasing function of the rate of gyration of the fluid in box 5 (it increases substantially in proportional ratio to said rate) and of the intensity of the flux of ionizing rays 14. The peripheral electrode 1 located in zone 3 where the gas is at a higher pressure is always positive with respect to the axial electrode 2.

It is probable that, due to the difference of pressure or of density between zones 3 and 4, the mean free path of the electrons (and also of the ions) produced in the gaseous stream by the ionizing radiations 14 is different, the mean free path being greater in the low pressure zone 4 than in the zone 3 at a higher pressure. Due to this fact, the plasma electrons have a kinetic energy higher in zone 4 than in zone 3. Therefore they negatively polarize electrode 2 with respect to the mass of plasma in box 5 to a higher degree, in absolute value, than that to which is negatively polarized electrode 1, which therefore becomes positive with respect to electrode 2. Thus a potential difference is produced between electrodes 1 and 2, the value of this potential difference being equal to the difference between the values of the negative polarization of electrodes 1 and 2, respectively.

It is also probable that the centrifugal force effective in the gaseous stream flowing with a gyration motion in box 5 has in the direction of arrows R has for its effect to accumulate the heaviest charges (positive ions) on the internal wall of box 5 in zone 3, which further increases the difference of potential between electrodes 1 and 2. It will be seen that it is advantageous to utilize, to form the gaseous stream, a gas, such as nitrogen or neon, which has no tendency to collect and retain the electrons resulting from ionization to form negative ions, whereas when said gas contains oxygen (e.g. when said gas consists of air), such electrons may be collected and retained.

We thus produce, in the device of FIGS. 1 and 2, an electromotive force averaging some tens of volts between electrodes 1 and 2, this difference of potential being available across the terminals $15_a$ and $16_a$ of conductors 15 and 16 respectively connected with electrodes 1 and 2 insulated from each other, box 5, together with its end walls 8 and 10, being made of an electricity insulating material (dielectric). Of course, terminal $15_a$ is positive with respect to terminal $16_a$.

It is possible to increase the available intensity by making use, as illustrated by FIG. 3 of the whole inner peripheral area of box 5 to constitute electrode 1, this area being then made of a substance which is a good conductor of electricity and being insulated from electrode 2, whereas end walls 8 and 10 are made of a substance which is a good insulator.

In order to obtain high ionization rates, we may coat, as shown by FIG. 6, the surface of electrode 2, at least partly, with a layer 19 of a fissionable substance such as uranium oxide, this layer having for instance a helical shape so that a portion of the surface of electrode 2 remains bare and continuous and can be polarized by the electrons of zone 4. Box 5 is placed in the vicinity of a neutron source 20 (and possibly of a source of ionizing rays 14) such as a nuclear reactor, in particular a swimming-pool reactor in the water (either light or heavy) of which box 5 is immersed. Under the effect of the slow neutrons from the swimming-pool reactor (or other source of neutrons), the fissionable product of layer 19 undergoes fissions and produces ionizing rays and particles, the effect of which becomes preponderating with respect to that of the ionizing rays coming directly from the swimming-pool reactor, or other neutrons source, to produce an intensive ionizing of the gaseous stream that flows through box 5 and to transform it essentially into a mixture of negative electrons and positive ions (plasma). The electrons and, to a lesser degree, the positive ions, serve, as above stated, to polarize electrodes 1 and 2 at different respective potential, thus producing a potential difference between terminals $15_a$ and $16_a$. With the exception of the ionizing means and of the structure of electrode 1, the operation of the generator of FIG. 3 is analogous to that of the generator of FIGS. 1 and 2. As a matter of fact, the same reference numerals have been used on said three figures to designate corresponding elements.

It will be easily understood that the means for producing a ionized gaseous stream having a pressure gradient may be different from those illustrated by way of preferred examples on FIGS. 1, 2 and 3.

In particular, we have shown in FIG. 4 very simple means consisting of a chamber or vessel 17 through which arrives a gas under pressure as illustrated by arrow F. This gas escapes from vessel 17 through a nozzle 18 toward free atmosphere in the direction of arrows G. We thus produce a pressure gradient, in particular between a zone 3 at high pressure $P_1$ located inside vessel 17 and a zone 4 at low pressure $P_2$ disposed on the outside of the vessel. The gaseous stream on the inside of vessel 17 is subjected to an intensive ionizing action, for instance by means of ionizing radiations 14 and two annular electrodes 1 and 2, are disposed in zones 3 and 4.

As above explained with reference to the embodiment of FIGS. 1 and 2, electrode 2, which is in the vicinity of the low pressure zone 4 (wherein the electrons of the ionized gaseous stream or plasma have a longer mean free path and therefore a greater kinetic energy than in zone 3) is polarized at a negative potential higher in absolute value than that to which is polarized electrode 1 placed in the high pressure zone 3. Consequently, electrode 2 becomes negative with respect to electrode 1.

It then suffices to connect conductors 15 and 16 with electrodes 1 and 2 respectively to obtain, across the terminals 15a and 16a, a potential difference that can be used.

The methods and devices according to the present invention have over those existing at the present time many advantages, and in particular the following ones:

They are easy to bring into play.

They permit of obtaining electric energy under the desired voltage and with suitable power.

The device comprises, with the exception of the parts that may be necessary for creating the gaseous stream, no mechanical piece in movement and its operation is very safe.

Its cost is very low.

Maintenance of the device is practically costless.

The following example will give indications concerning the present invention.

In a device of the type shown by FIGS. 1 and 2, fed with argon and ionized by means of X-rays of an energy between 10 and 25 kev. (for which energy ionization by photoelectric effect is preponderating but may be accompanied by the Auger effect), it has been possible to produce from $10^8$ to $10^9$ high energy primary ion-electron pairs per cm.$^3$ and per second, the primary electrons rapidly loosing their energy and creating nearly $10^{11}$ secondary ion-electron pairs per cm.$^3$ and per second. It seems that it is essentially the secondary electrons which permit of obtaining the potential difference averaging some tens of volts with electrodes of an area corresponding to a fraction of a square centimeter at a distance of one centimeter from each other, the pressure difference between these two electrodes being 100 millimeters of mercury. This preponderating influence of the secondary electrons would also explain the value of the short circuit current (averaging $10^{-9}$ ampere).

In a general manner, while we have, in the above description, disclosed what we deem to be practical and efficient embodiments of the invention, it should be well understood that we do not wish to be limited thereto as there might be changes made in the arrangement, disposition and form of the parts without departing from the principle of the present invention as comprehended within the scope of the appended claims.

What we claim is:

1. A method of generating electrical energy which comprises creating a gaseous stream having a substantial pressure gradient, placing in said gaseous stream two electrodes located respectively in a first zone and in a second zone of said gaseous stream where the corresponding pressures are different, due to this pressure gradient, ionizing said gaseous stream substantially uniformly at least in the portion thereof comprising said two zones, and collecting, between said electrodes, a potential difference which is an increasing function both of the pressure difference between said two zones and of the level of ionization of said gaseous stream portion.

2. A device for generating electrical energy substantially constituted by, means for producing a gaseous stream having a substantial pressure gradient, two electrodes located in two zones of said stream at different respective pressures, means for ionizing substantially uniformly at least the portion of said gaseous stream comprising both of said zones and means for collecting the potential difference thus generated across said two electrodes.

3. A device for generating electrical energy which comprises, in combination, a box having a side wall in the shape of a circular cylinder portion, and two end walls, a first one and a second one, transverse to the generatrices of said cylinder, said first end wall being provided with a peripheral slot and said second end wall being provided with a central hole, means for feeding a gaseous stream under pressure into said box, along at least one generatrix of said cylinder and tangentially thereto, thereby providing a pressure gradient inside said box between the periphery thereof at a higher pressure and along the axis thereof at a lower pressure, a first electrode located on the inside of said box substantially at the periphery thereof, a second electrode located on the inside of said box substantially along the axis thereof, means for ionizing the gaseous stream in said box and means for collecting the potential difference thus generated across said two electrodes.

4. A device according to claim 3 wherein said first electrode is a linear elongated conductor disposed along one generatrix of said cylinder, said cylinder being made of an electrically insulating material.

5. A device according to claim 3 wherein said first electrode consists of the inner surface of said box, said box being made of an electricity conducting material.

6. A device for generating electrical energy which comprises, in combination, a box having a side wall in the shape of a circular cylinder portion, and two end walls, a first one and a second one, transverse to the generatrice of said cylinder, said first end wall being provided with a peripheral slot and said second end wall being provided with a central hole, means for feeding a gaseous stream under pressure into said box, along at least one generatrix of said cylinder and tangentially thereto thereby providing a pressure gradient inside said box between the periphery thereof at a higher pressure and along the axis thereof at a lower pressure, a first electrode located on the inside of said box substantially at the periphery thereof, a second electrode consisting of a cylindrical conductor disposed along the axis of said box, means for ionizing the gaseous stream in said box and means for collecting the potential difference thus generated across said two electrodes.

7. A device according to claim 6 wherein said ionizing means comprise a source of neutrons disposed on the outside of said box and a layer of fissionable product on a portion of the outer wall of said second electrode.

8. A device according to claim 6 wherein said ionizing means comprise a nuclear reactor in which said box is located and a layer of fissionable products on a portion of the outer wall of said second electrode.

9. A device according to claim 3 wherein said ionizing means consist of an intensive ionizing radiation source.

10. A device for generating electrical energy which comprises, in combination, a vessel fed with a gaseous stream under pressure, a nozzle forming the outlet end of said vessel and opening into the atmosphere, a first electrode disposed inside said vessel so as to be located in said gaseous stream, a second electrode disposed on the outside of said vessel close to said nozzle so as to be located in the expanded gaseous stream flowing out from said vessel, means for ionizing at least the portion of said gaseous stream between said two electrodes and means for collecting the potential difference thus generated across said two electrodes.

References Cited by the Examiner

UNITED STATES PATENTS

| | | | |
|---|---|---|---|
| 2,262,370 | 8/1939 | Penney | 324—33 |
| 2,861,452 | 4/1956 | Morgan | 73—194 |
| 3,084,629 | 4/1959 | Yevick | 176—1 |

RODNEY D. BENNETT, *Primary Examiner.*

CHESTER L. JUSTUS, *Examiner.*

J. P. MORRIS, *Assistant Examiner.*